United States Patent
Karaoguz et al.

(10) Patent No.: US 7,433,697 B2
(45) Date of Patent: Oct. 7, 2008

(54) SYNCHRONIZED UWB PICONETS FOR SIMULTANEOUSLY OPERATING PICONET PERFORMANCE

(75) Inventors: Jeyhan Karaoguz, Irvine, CA (US);
Eric J. Ojard, San Francisco, CA (US);
Edward H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 668 days.

(21) Appl. No.: 10/873,666

(22) Filed: Jun. 22, 2004

(65) Prior Publication Data
US 2005/0090200 A1     Apr. 28, 2005

Related U.S. Application Data

(60) Provisional application No. 60/514,184, filed on Oct. 24, 2003.

(51) Int. Cl.
*H04Q 7/20* (2006.01)
*H04Q 7/00* (2006.01)
*H04B 15/00* (2006.01)

(52) U.S. Cl. .................. 455/458; 455/574; 375/354

(58) Field of Classification Search ............... 370/328; 375/354; 455/422.1, 458, 574
See application file for complete search history.

(56) References Cited

U.S. PATENT DOCUMENTS

| | | | | |
|---|---|---|---|---|
| 7,231,221 | B2 * | 6/2007 | Assarsson et al. | 455/458 |
| 7,245,947 | B2 * | 7/2007 | Salokannel et al. | 455/574 |
| 7,254,202 | B2 * | 8/2007 | Cattaneo et al. | 375/354 |

* cited by examiner

*Primary Examiner*—William D Cumming
(74) *Attorney, Agent, or Firm*—Garlick Harrison & Markison; Shayne X. Short

(57) ABSTRACT

Synchronized UWB piconets for SOP (Simultaneously Operating Piconet) performance. A common backbone (either wired or wireless) is employed that provides a common CLK (clock signal) to all of the various PNCs (piconet coordinators) of various piconets that may operate within a sufficiently close region such that interference could undesirably occur. By providing a very reliable CLK signal from a common backbone to all of the PNCs of the various piconets operating within a substantially close proximity to one another, very precise synchronization may be ensured for all of the communications performed therein. The various piconets may then even operate using TDMA (Time Division Multiple Access)—whose performance would be substantially compromised without effective synchronization. In addition, combined TFC (time frequency code) and TDMA may also be employed to support the communications therein thereby providing even another degree of orthogonality that provided by TDMA alone.

48 Claims, 13 Drawing Sheets

2 SOPs (Simultaneously Operating Piconets) with PNCs (piconet coordinators) coupled to common backbone

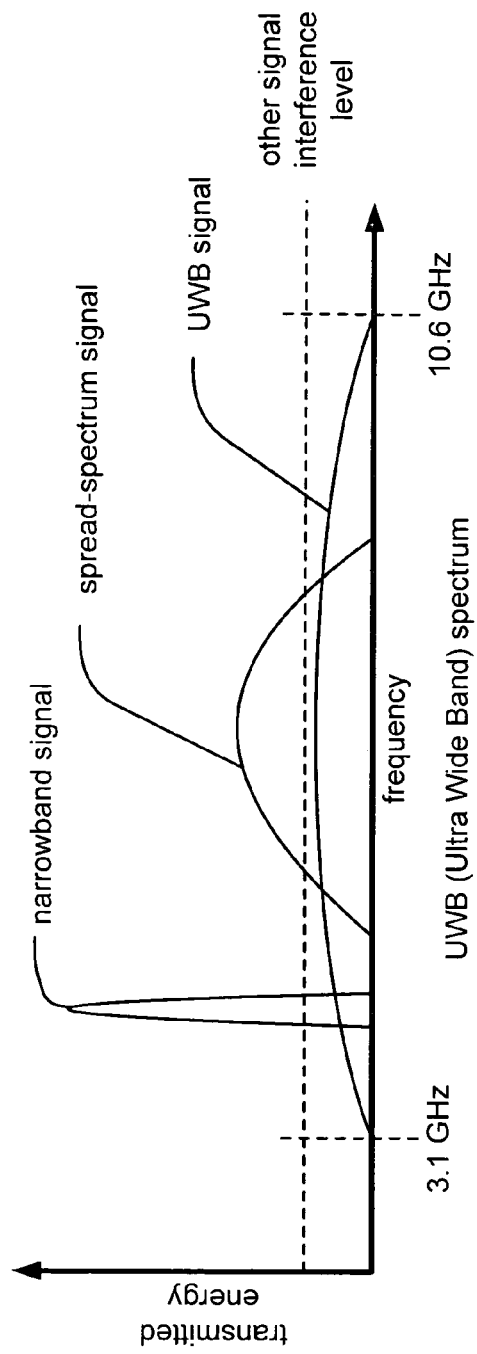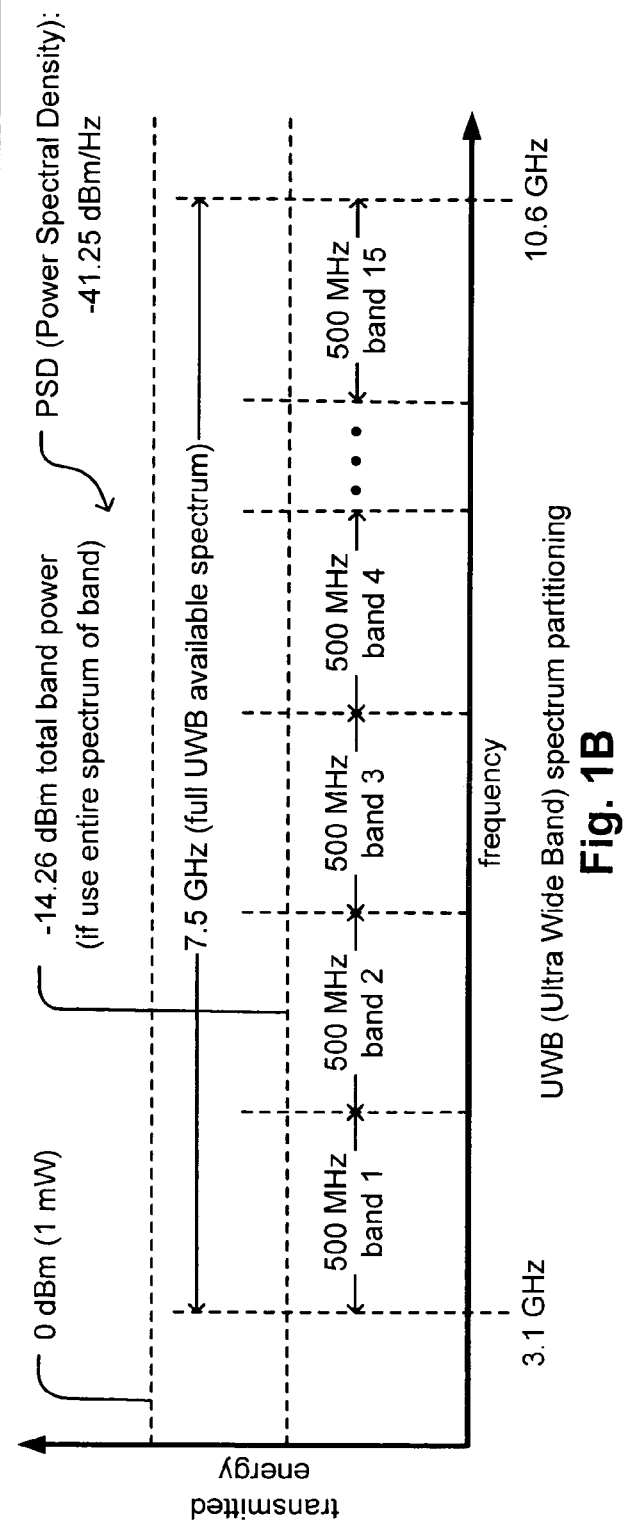

piconet (shown in wireless communication system embodiment)

TDMA (Time Division Multiple Access)

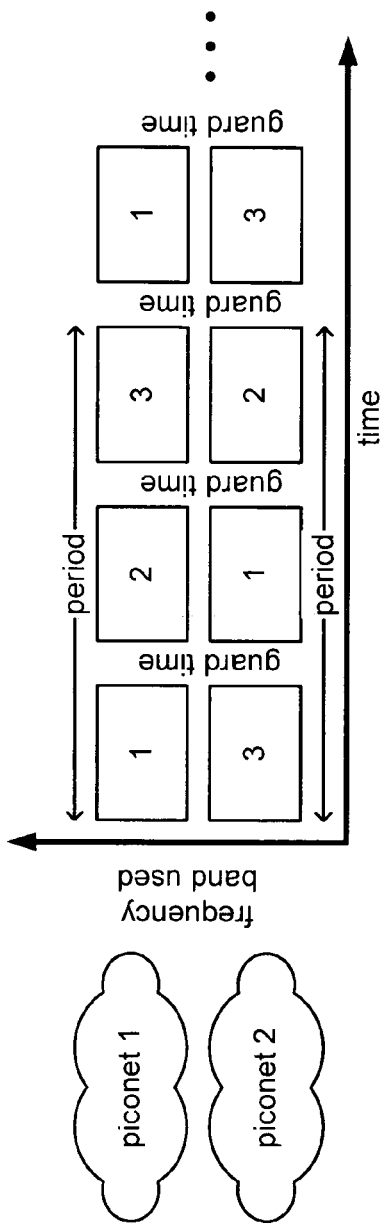
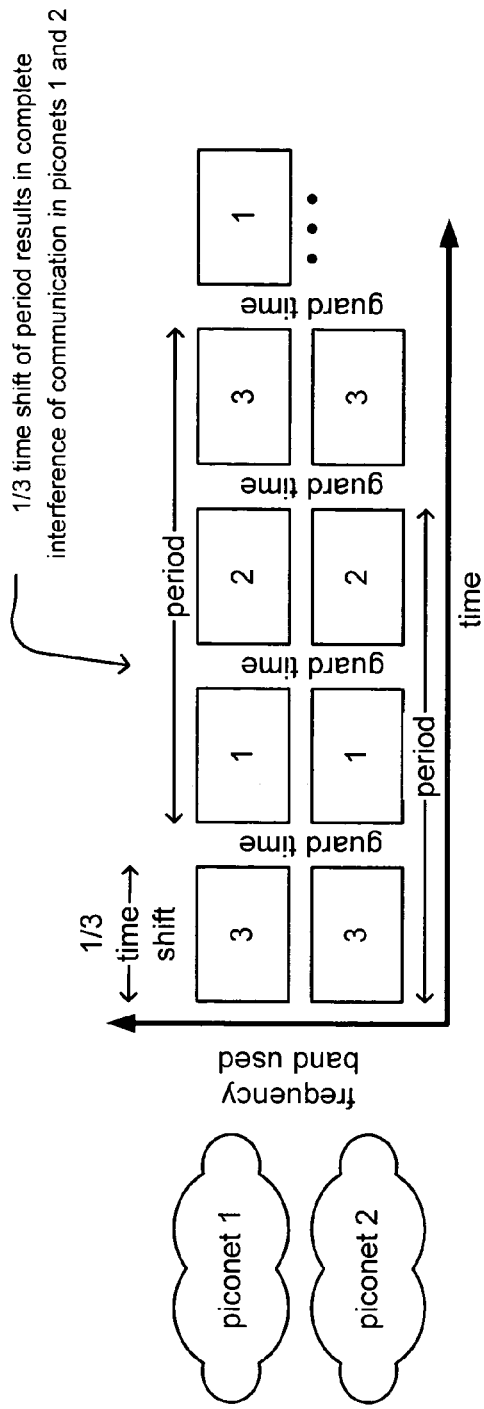

2 synchronized SOPs (Simultaneously Operating Piconets) using TDMA 2 non-synchronized SOPs using TDMA (piconet 1 has less than 1/3 period shift with respect to piconet 2)

3 SOPs (Simultaneously Operating Piconets) using TDMA only

3 SOPs using combined TFC and TDMA

3 SOPs (Simultaneously Operating Piconets) with PNCs (piconet coordinators) coupled to common backbone 2 SOPs (Simultaneously Operating Piconets) with PNCs (piconet coordinators) coupled to common backbone method for operating synchronized SOPs (Simultaneously Operating Piconets)

method for operating synchronized SOPs (Simultaneously Operating Piconets)

US 7,433,697 B2

SYNCHRONIZED UWB PICONETS FOR SIMULTANEOUSLY OPERATING PICONET PERFORMANCE

CROSS REFERENCE TO RELATED PATENTS/PATENT APPLICATIONS

The present U.S. Utility patent application claims priority pursuant to 35 U.S.C. § 119(e) to the following U.S. Provisional Patent Application which is hereby incorporated herein by reference in its entirety and made part of the present U.S. Utility patent application for all purposes:

1. U.S. Provisional Application Ser. No. 60/514,184, entitled "Synchronized UWB piconets for SOP (Simultaneously Operating Piconet) performance," filed Oct. 24, 2003 (Oct. 24, 2003), pending.

BACKGROUND OF THE INVENTION

1. Technical Field of the Invention

The invention relates generally to communication systems; and, more particularly, it relates to synchronization of communication between various devices within such communication systems.

2. Description of Related Art

Data communication systems have been under continual development for many years. In recent years, WPANs (Wireless Personal Area Networks) have been under increasing development. A WPAN may be viewed as a network that is established when two or more devices connect to support communication of data between themselves in an area having a radius of up to approximately 10 meters. Typically, earlier implementations of WPANs include a central PNC (piconet coordinator) that governs the communication of all of the other communication devices within the WPAN. Also, any of the communication devices within such a WPAN is typically capable of operating as the PNC.

As is known, the Bluetooth® communication standard is the first such PAN (Personal Area Network) communication standard that has been developed. In accordance with the Bluetooth® communication standard, the communication between the various devices in such a WPAN is strictly performed using an M/S (Master/Slave) configuration. Each of the devices within such a Bluetooth® WPAN is M/S capable. Typically one of the devices (sometimes referred to as piconet controller in this situation), or a first device within the Bluetooth® WPAN, transmits a beacon signal (or an access invitation signal) while operating as the "master" device of the Bluetooth® WPAN to the other "slave" devices of the Bluetooth® WPAN. In other words, the "master" device of the Bluetooth® WPAN polls the other "slave" devices to get them to respond.

However, other WPANs may be implemented such that the devices do not operate according to such an M/S (Master/Slave) type relationship. Typically, some of the communication devices within the WPAN are designated and operate as PNCs, and some of the communication devices are designated and operate as DEVs (wireless communication devices within the WPAN are not PNCs). The PNCs operate to coordinate the communication between themselves and the DEVs within the WPAN. Sometimes, such a PNC may be implemented to operate as a master with respect to the 1 or more DEVs that operate as slaves, but this need not be the case in all instances—the strict M/S relationship is typically the case only in a Bluetooth® WPAN.

In even some other instances, two or more Bluetooth® piconets operate cooperatively such that they communicate via the masters of the two or more corresponding Bluetooth® piconets. For example, in a scatternet, a single DEV may interact with two or more masters. This implementation will allow various devices within different piconets that are located relatively far from one another to communicate with one another via the masters of their corresponding piconets. However, within a scatternet implementation, a problem may arise such that each of the individual piconets must be able to operate in relative close proximity with other piconets without interfering with one another. This inherently requires a great deal of synchronization between the piconets, which may be very difficult to achieve in some instances. It is also noted that independently operating piconets, not implemented within a scatternet implementation, may also suffer from deleterious effects of interference with other piconets located within relative close proximity.

Some PAN communication standards and recommended practices have been developed (and some are still being developed) by the IEEE (Institute of Electrical & Electronics Engineers) 802.15 working group. These standards and recommended practices may generally be referred to as being provided under the umbrella of the IEEE 802.15 working group. Perhaps the most common standard is the IEEE 802.15.1 standard which adopts the core of Bluetooth® and which generally can support operational rates up to approximately 1 Mbps (Mega-bits per second).

The IEEE 802.15.2 recommended practice specification has been developed primarily in an effort to support the co-existence of the IEEE 802.15.1 Bluetooth® core with IEEE 802.11b and IEEE 802.11g WLANs (Wireless Local Area Networks). As some examples of the pertinent frequency spectra of concern, the IEEE 802.11b and IEEE 802.11g WLAN (Wireless Local Area Network) standards both operate within the approximate 2.4 GHz frequency range. The IEEE 802.11a WLAN standard operates within the approximate 5 GHz frequency range. This IEEE 802.15.2 recommended practice specification has been developed to ensure that such a WLAN and a Bluetooth® piconet may operate simultaneously within relatively close proximity of one another without significant interference with one another.

In addition, the IEEE 802.15.3 high data rate PAN standard has been developed in an effort to support operational rate up to approximately 55 Mbps. In this IEEE 802.15.3 standard, the PNCs and DEVs do not operate according to an M/S relationship as they do according to Bluetooth®. In contradistinction, a PNC operates generally as an AP (Access Point) and manages the various DEVs such that they are guaranteed to perform their respective communication according to their appropriate time slots thereby ensuring proper performance and operation within the piconet. An extension (currently under progress) of the IEEE 802.15.3 high data rate PAN standard is the IEEE 802.15.3 WPAN (Wireless Personal Area Network) High Rate Alternative PHY Task Group 3a (TG3a). This is sometimes referred to the IEEE 802.15.3a extended high data rate PAN standard, and it can support operational rates up to 480 Mbps.

Yet another standard developed by the IEEE 802.15 working group is the IEEE 802.15.4 low data rate PAN standard that generally supports data rates within the range of approximately 10 kbps (kilo-bits per second) and 250 kbps.

One of the major concerns when operating a WPAN (that may include multiple SOPs relatively close to one another) is the undesirable interference that can occur between the devices of different piconets. There are at present, insufficient means by which this undesirable interference may be minimized.

BRIEF SUMMARY OF THE INVENTION

Various aspects of the invention can be found in a WPAN (Wireless Personal Area Network) communication system that includes at least 2 SOPs (Simultaneously Operating Piconets). A first piconet includes a first PNC (piconet coordinator) and a first plurality of DEVs (user piconet devices), and a second piconet including a second PNC and a second plurality of DEVs. The first PNC and the first plurality of DEVs are operable to communicate with each other using UWB (Ultra Wide Band) signals according to a first TDMA (Time Division Multiple Access) transmission slots, and the second PNC and the second plurality of DEVs are operable to communicate with each other using UWB signals according to a second TDMA transmission slots. The piconet communication system also includes a common backbone that is communicatively coupled to the first PNC and the second PNC. A CLK (clock signal) is provided to each of the first PNC and the second PNC via the common backbone. This common backbone may be implemented as a wired backbone or a wireless backbone in various embodiments. For example, the various communication devices described herein may include a dual band radio such that synchronization may be achieved using a different frequency spectrum for synchronization than is used for communication of data. The first PNC and the second PNC use the CLK to synchronize the first TDMA transmission slots and the second TDMA transmission slots.

In certain embodiments, the first PNC and the first plurality of DEVs are operable to communicate with each other using the first TDMA transmission slots that is implemented according to a first TFC (time frequency code). Similarly, the second PNC and the second plurality of DEVs may also be implemented to communicate with each other using the second TDMA transmission slots that is implemented according to a second TFC (time frequency code). This backbone may be implemented in a variety of different ways. For example, the backbone may be that communicatively couples to the first PNC and the second PNC may be implemented as an IEEE (Institute of Electrical & Electronics Engineers) 802.3 Ethernet wired backbone; the backbone may alternatively be implemented as an IEEE 802.11 wireless backbone. Clearly, other wired and wireless means may alternatively be employed besides the IEEE 802.3 Ethernet wired backbone and the IEEE 802.11 wireless backbone specifically mentioned here without departing from the scope and spirit of the invention.

Moreover, the first PNC may be implemented within a first combination IEEE 802.11 AP (Access Point)/IEEE 802.15.3a PNC, and the second PNC may be implemented within a second combination IEEE 802.11 AP/IEEE 802.15.3a PNC. In such instances, the backbone may be implemented as an IEEE 802.3 Ethernet wired backbone that communicatively couples to the first combination IEEE 802.11 AP/IEEE 802.15.3a PNC and the second combination IEEE 802.11 AP/IEEE 802.15.3a PNC.

The 2 piconets that compose the SOPs may be implemented such that the first piconet operates within a first region, and the second piconet operates within a second region. The first region and the second region occupy at least a portion of common space.

The piconets may be implemented as any number of types of piconets. For example, one of the piconets may be implemented as a TV (television) piconet such that the first plurality of DEVs includes any one or more of a wireless remote, a cable STB (Set Top Box), a satellite STB, a VCR (Video Cassette Recorder), a DVD (Digital Versatile/Video Recorder), and a DVR (Digital Video Recorder) that includes piconet operable communication functionality. Similarly, one of the piconets may be implemented as a computer piconet such that the second plurality of DEVs includes one or more of a wireless mouse, a wireless mouse keyboard, a printer, and an MFP (Multi-Functional Peripheral) that includes piconet operable communication functionality.

It is also noted that the various DEVs within the piconets may be implemented to support p2p (peer to peer) communication. This may be facilitated using the PNCs within the respective piconets. For example, the first PNC may be implemented to facilitate p2p communication between a first DEV and a second DEV of the first plurality of DEVs.

The UWB signals employed within the first piconet and the second piconet occupy a frequency spectrum that spans from approximately 3.1 GHz (Giga-Hertz) to approximately 10.6 GHz, and the frequency spectrum is partitioned into a plurality of frequency bands each having a bandwidth of approximately 500 MHz (Mega-Hertz).

The invention envisions any type of communication system and/or communication device that supports the functionality and/or processing described herein. Moreover, various types of methods may be performed to support the functionality described herein without departing from the scope and spirit of the invention as well.

BRIEF DESCRIPTION OF THE SEVERAL VIEWS OF THE DRAWINGS

FIG. 1A is a diagram illustrating an embodiment of the frequency spectrum of a UWB (Ultra Wide Band) signal when compared to some other signal types according to the invention.

FIG. 1B is a diagram illustrating an embodiment of UWB (Ultra Wide Band) spectrum partitioning into a plurality of sub-bands according to the invention.

FIG. 6A is a diagram illustrating an embodiment of 2 synchronized SOPs (Simultaneously Operating Piconets) using TDMA that may be supported according to the invention.

FIG. 6B is a diagram illustrating an embodiment of 2 non-synchronized SOPs using TDMA that undergo a significant amount of interference when not employing various aspects of the invention.

DETAILED DESCRIPTION OF THE INVENTION

FIG. 1A is a diagram illustrating an embodiment of the frequency spectrum of a UWB (Ultra Wide Band) signal when compared to some other signal types according to the invention. UWB communications operate by sending pulses whose energy spreads across a broad frequency spectrum. For comparison, RF (Radio Frequency) communications typically operate by using a narrowband frequency carrier to transmit information. RF signals may be viewed as occupying a relatively narrowband range of frequency spectra. It is also noted that the PSD (Power Spectral Density) of a UWB signal typically does not rise above the PSDs of other interfering signals within an available spectrum of interest.

A UWB signal is one type of a spread-spectrum signal. A spread-spectrum signal may be viewed as a signal that occupies a frequency band that is much wider than the minimum bandwidth required by the information signal. For example, a transmitter "spreads" the energy (that is typically originally concentrated in narrowband) across a wider frequency band. One benefit of a spread-spectrum signal is that it provides increased immunity with respect to narrowband interference. A narrowband signal will not fully obliterate the UWB signal because of the much wider bandwidth of the UWB signal. It is also important to note that a UWB signal may also be characterized as a function of time, not frequency.

FIG. 1B is a diagram illustrating an embodiment of UWB (Ultra Wide Band) spectrum partitioning into a plurality of sub-bands according to the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any UWB signal within the available UWB spectrum to be 500 MHz (Mega-Hertz).

Moreover, this FCC definition allows for a PSD across the UWB spectrum of −41.25 dBm/MHz of bandwidth. As a reminder, 0 dBm is the decibel (dB) measure of power of a signal referenced to 1 mW (milli-Watt). This means that the total power that may be employed by a UWB signal is approximately −14.26 dBm in any individual 500 MHz sub-band within the entire available UWB bandwidth of 7.5 GHz. In addition, if a pulse is sent using the entire 7.5 GHz of available UWB bandwidth, then the total transmitted power of a UWB signal is approximately −2.5 dBm.

Figure 2A:
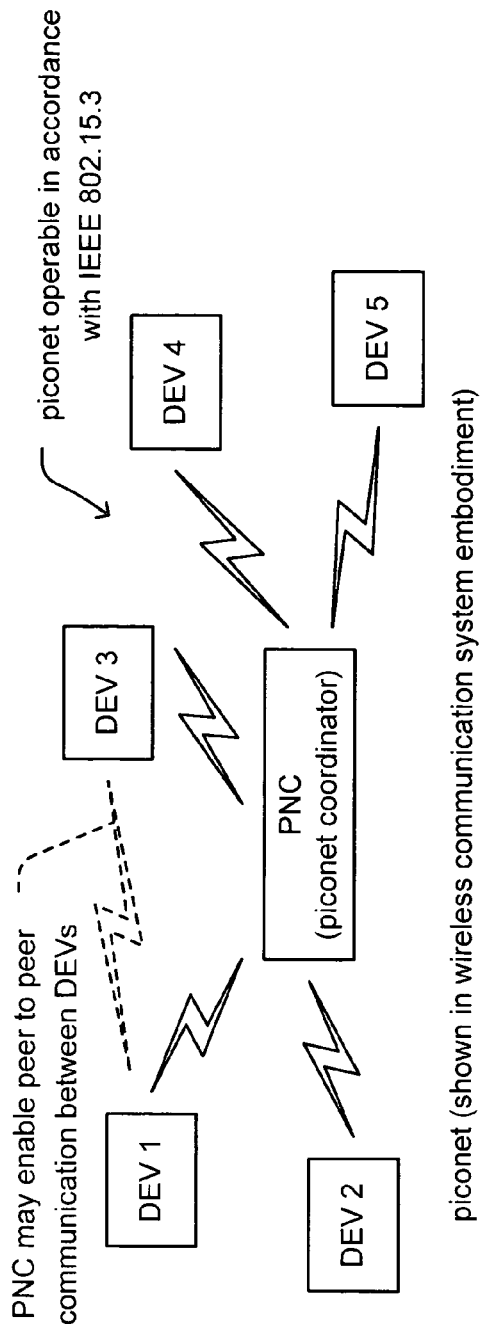
FIG. 2A is a diagram illustrating an embodiment of a piconet (shown as a wireless communication system) that is built according to the invention.

FIG. 2A is a diagram illustrating an embodiment of a piconet (shown as a wireless communication system) that is built according to the invention. In general, a piconet may be viewed a subset of the general type of wireless type network, WPAN. The use of the terminology piconet is typically used to characterize the smallest such wireless type network that falls under the WPAN umbrella. From this perspective, a piconet may be viewed as being the network that is established when any two devices connect to support communication between them. The piconet may be implemented using a number of piconet operable devices such that one of the piconet operable devices is designated as and operates as a PNC (piconet coordinator) and 1 or more of the other piconet operable devices are designated as and operate as DEVs (piconet devices). In some instances, the DEVs may communicate with one another according to a p2p (peer to peer) relationship. Alternatively, the DEVs may communicate with one another via the PNC (where the PNC operates essentially as a relaying element).

To support communication between each of the DEVs (which may be performed simultaneously at some times) and the PNC, the communication must be implemented in such a way that the communication links between each DEV and the PNC will not interfere with the other communication links in any other SOP (Simultaneously Operating Piconet) that is located within a relatively close proximity to this piconet. That is to say, when two or more piconets operate within relatively close proximity to one another, the communication within each of the respective piconets must be implemented in such a way that simultaneously operation of the two or more piconets (e.g., the coexistence and operation) may be performed without interfering with one another.

Moreover, the piconet in this embodiment, as well as within other embodiments described herein are operable in accordance with the constraints provided by the IEEE 802.15.3a standard (that is currently under development) and may also be implemented such that the piconet is operable in accordance with other wireless communication standards as well.

Figure 2B:
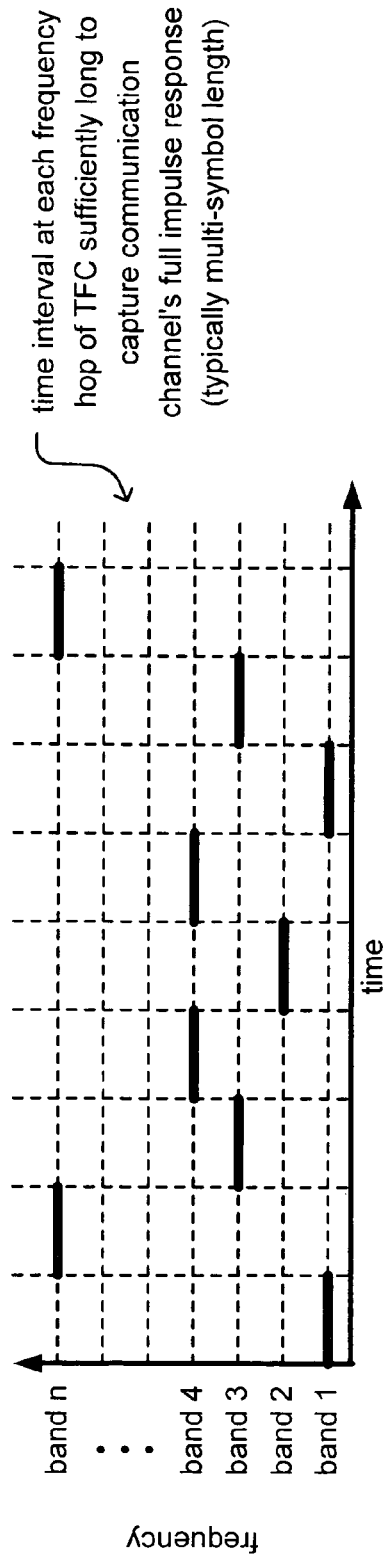
FIG. 2B is a diagram illustrating an embodiment of a TFC (time frequency code) (having a period) that may be employed according to the invention.

FIG. 2B is a diagram illustrating an embodiment of a TFC (time frequency code) (having a period) that may be employed according to the invention. As a function of time, the frequency band that is being used "hops" from one frequency band to another according to the TFC. The use of a TFC is one means of operation that may be used to make a communication channel more robust. For example, when noise, such as background noise, is relatively localized to a particular portion of the spectrum, the TFC helps to minimize the deleterious effects generated by such frequency specific and frequency localized noise.

Frequency hopping may be viewed as a periodic switching of the frequency of a signal during transmission. In a communication system, a transmitter and a receiver operate in synchronization so that each operates at the same frequency at any given time. In this particular embodiment, an available frequency spectrum is sub-divided into n bands. The communication operates using a band 1 during a first time interval, then operates using a band n during a second time interval, then operates using a band 3 during a third time interval, and so on as indicated in the diagram.

It is also noted that the time interval between the various frequency hops is sufficiently long so as to permit the capture of a communication channel's full impulse response. This time interval at which the communication system operates at any given frequency will typically be multi-symbol lengths in duration.

As an example of the operation of frequency hopping, in the context a UWB signal, the UWB spectrum may be divided into 15 sub-bands of 500 MHz bandwidth, the frequency hopping may be viewed as hopping between the various 500 MHz bandwidth sub-bands as a function of time.

Figure 3:
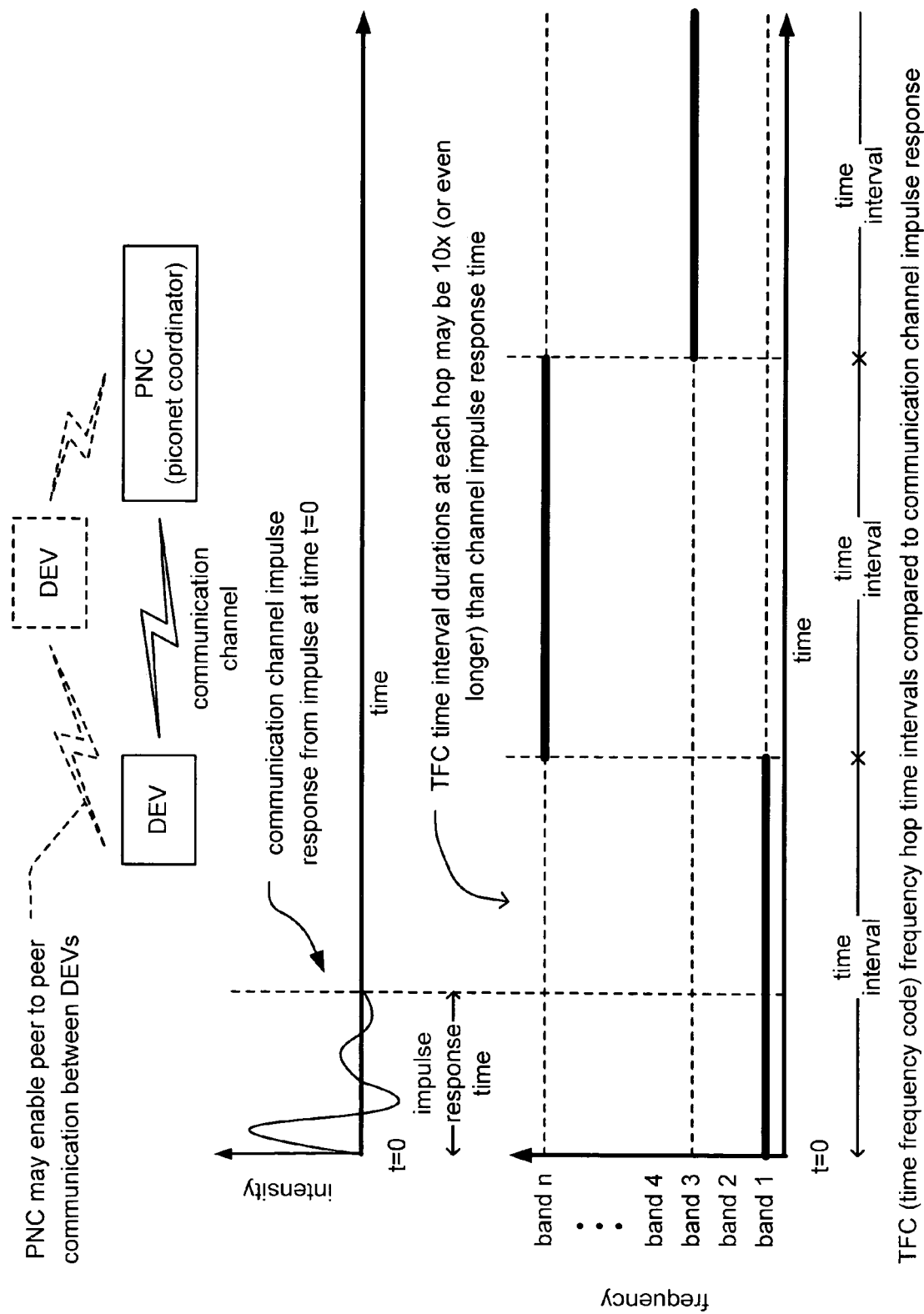
FIG. 3 is a diagram illustrating an embodiment showing TFC (time frequency code) frequency hop time intervals compared to a communication channel impulse response according to the invention.

FIG. 3 is a diagram illustrating an embodiment showing TFC (time frequency code) frequency hop time intervals compared to a communication channel impulse response according to the invention. The impulse response, as a function of time, is shown for the communication channel between two DEVs (or between a PNC and one of the DEVs). This impulse response may be viewed as the response of the communication system when an impulse is provided thereto. The impulse response varies in intensity as a function of time before dissipating. The time that the impulse response takes to dissipate completely may be viewed as the impulse response time of the communication channel.

When compared to the impulse response time of the communication channel, the TFC time interval durations at which the communication system operates using a first frequency band (shown as a band 1 during a first time interval) is much longer (e.g., substantially longer) than the impulse response time of the communication channel. In some embodiments, the TFC time interval durations are significantly longer that the impulse response time of the communication channel. As one example, the TFC time interval durations are may be up to ten times (e.g., 10×) longer than the impulse response time of the communication channel. This will allow all of the energy of a pulse to be captured when transmitted and when operating at this frequency band. Similarly, when the operation switches to another frequency band according to the TFC, then that corresponding time interval will also be longer than the impulse response time of the communication channel.

Within some prior art modes of piconet operation, frequency hopping alone has been implemented such that the time intervals are typically only of a single symbol's length; this is typically much shorter than the impulse response time of the communication channel. As such, much of the energy of a transmitted pulse may be lost if the frequency hops are performed too quickly. The longer duration over which the frequency hops are performed according to the invention allows for capturing of all of the energy of the transmitted pulse thereby ensuring more robust and more accurate communications. In addition, the invention provides a solution that may employ combined OFDM (Orthogonal Frequency Division Multiplexing) encoding and TFC modulation of the OFDM symbols to support simultaneous operation of multiple piconets that each may include multiple DEVs. Moreover, the invention provides a solution that may employ combined TFC and TDMA of the communication between the various DEVs and/or PNCs of the various piconets.

It is also noted that a PNC may enable p2p (peer to peer) communication between two separate DEVs within a piconet. The manner of communication described herein may be implemented with respect to communication between a PNC and the DEVs of the piconet and also may be implemented with respect to p2p communication between two separate DEVs within any such piconet envisioned herein.

Figure 4:
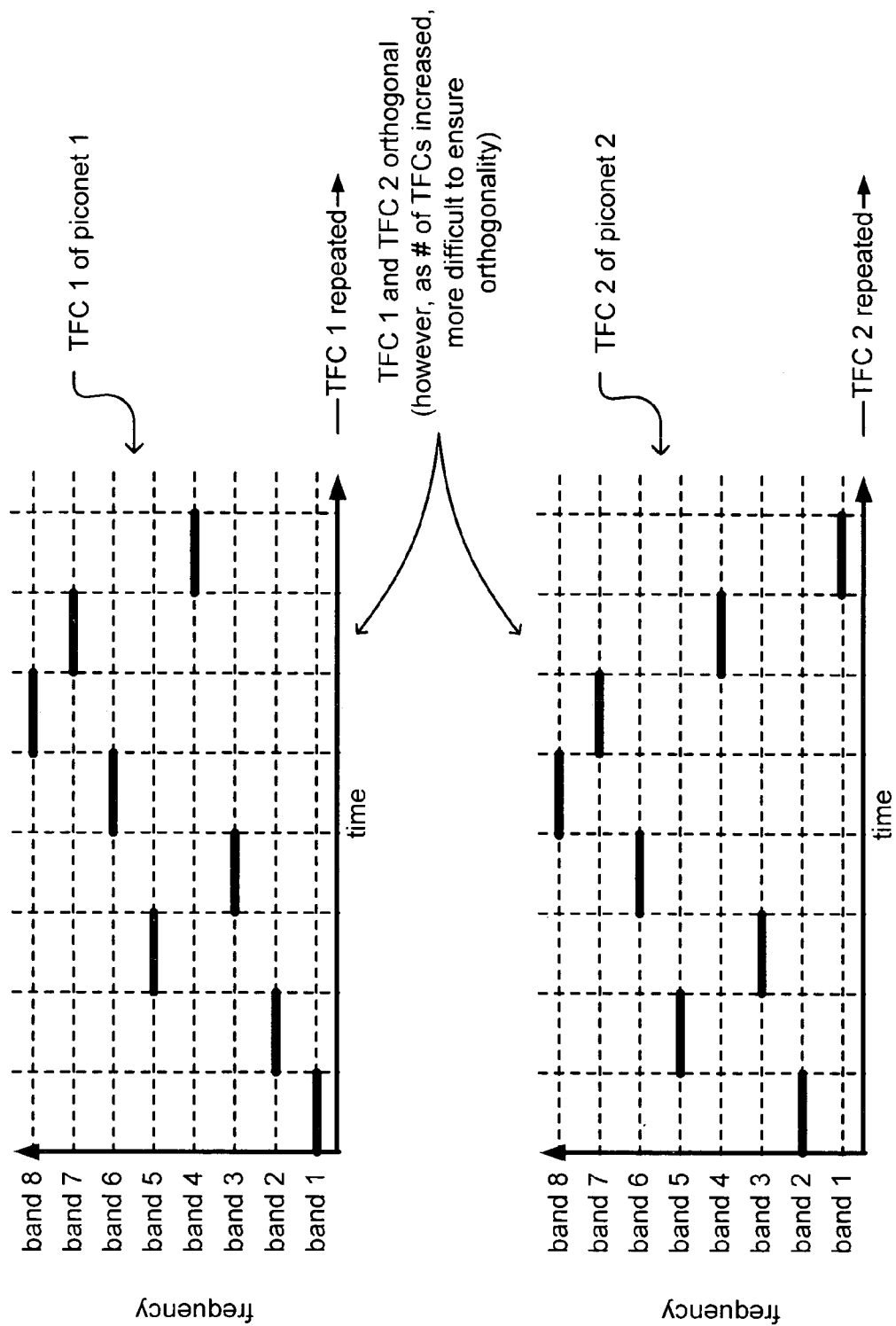
FIG. 4 is a diagram illustrating another embodiment of TFCs (time frequency codes) that may be employed according to the invention.

FIG. 4 is a diagram illustrating another embodiment of TFCs (time frequency codes) that may be employed according to the invention. This embodiment shows how two separate piconets may operate using two separate TFCs that are orthogonal to one another. However, it is also noted that as the number of TFCs employed to support communication of SOPs (Simultaneously Operating Piconets) continues to increase, and given the fact that there is a finite number of bands employed within any TFC, trying to maintain orthogonality of the TFCs will be more and more difficult. While this is possible with a small number of SOPs, it becomes impossible as the number of SOPs increases, given the inherent periodicity of the TFCs and/or finite number of frequency bands that limit the number of frequency hops that may be performed.

However, within an embodiment that employs only 2 SOPs, a piconet 1 employs a TFC 1 to support communication between the devices includes therein. In addition, a piconet 2 employs a TFC 2 to support communication between the devices includes therein. In this embodiment, during each time interval, the TFC 1 and the TFC 2 each operate using a different band. For example, when the TFC 1 operates using the band 1, the TFC 2 operates using the band 2. Similarly, when the TFC 1 operates using the band 2, the TFC 2 operates using the band 5. This orthogonal operation of the 2 TFCs continues for the duration of the operation of the respective SOPs.

Each of the respective TFCs is repeated to support subsequent operation within each of the respective piconets. This orthogonal operation of employing two TFCs allows more than one piconet to coexist in relative close proximity with one another. In addition, it is noted that each of the devices within a respective piconet will communicate with each other using the TFC that corresponds to that piconet. Even in this example, it can be seen that improved performance may be achieved when synchronization of these TFCs is ensured.

Figure 5:
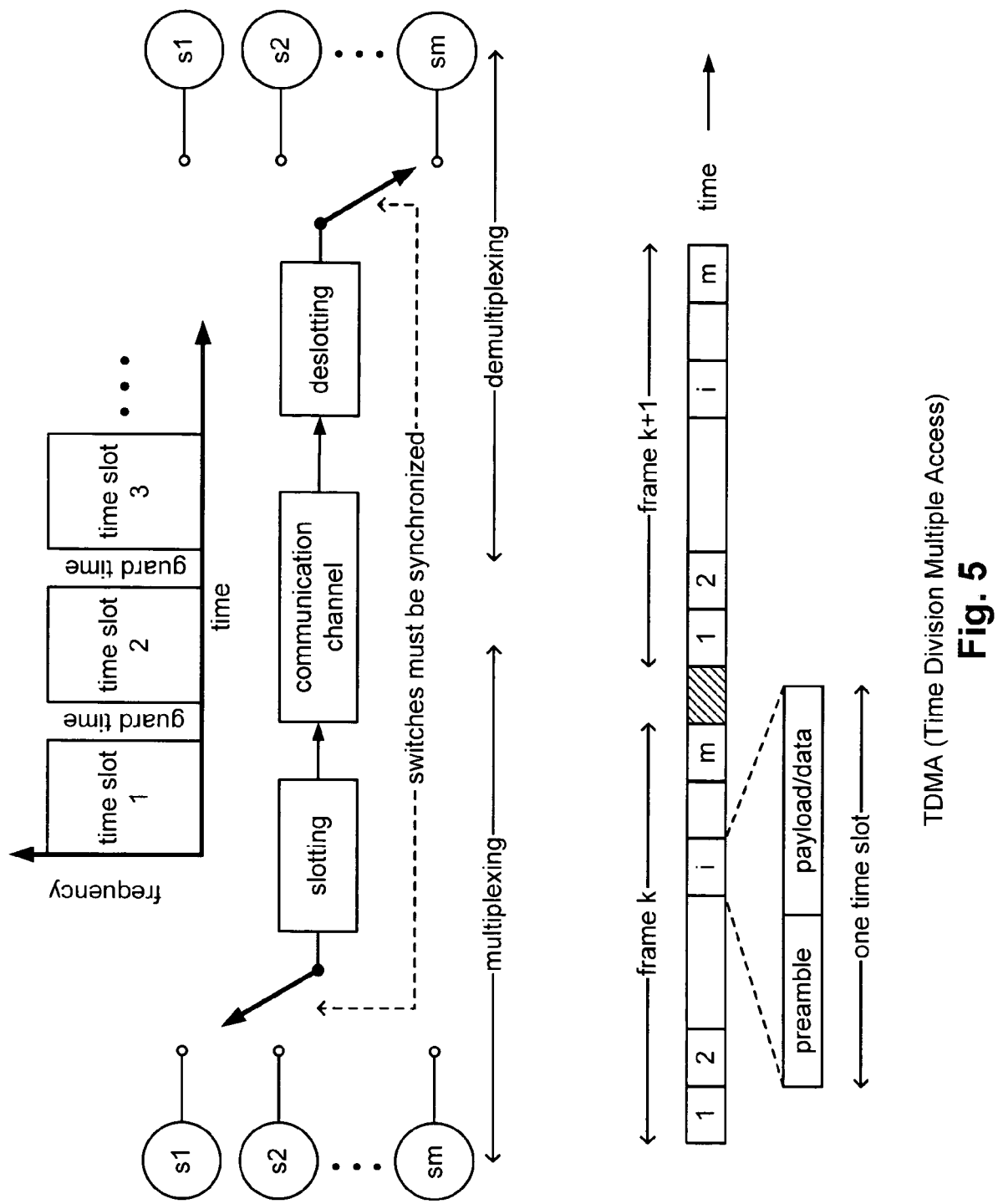
FIG. 5 is a diagram illustrating an embodiment of TDMA (Time Division Multiple Access) that may be employed according to the invention.

FIG. 5 is a diagram illustrating an embodiment of TDMA (Time Division Multiple Access) that may be employed according to the invention. TDMA is one way in which sharing of a common available communication resource (or communication channel) that may be shared among and between multiple devices within a communication system. Within TDMA, the inherently finite-limited communication channel is shared by assigning each of the various signals (between the various devices) or users (e.g., DEVs and/or PNCs) the full available frequency spectrum of the communication system for a short duration of time (oftentimes referred to as a time slot). Between the various time slots, guard times allow for some time uncertainty between the signals in adjacent time slots. These guard times may be viewed as acting as a buffer zone between the various time slots to reduce interference.

Time is segmented into intervals that are sometimes referred to as frames. Each of the frames is also partitioned into assignable user time slots. The frame structure repeats, so that a fixed TDMA assignment constitutes one or more slots that periodically appear during each frame time. Each of the transmitting devices then transits its data in bursts, times so as to arrive at the appropriate receiving devices coincident with its designated 1 or more time slots. When the data bursts are received by the receiving device, they are appropriately demultiplexed and provided to the appropriate receiving device.

This diagram shows a very straight-forward fixed TDMA communication system. There are m time slots that make up each frame that have been assigned to various signal sources (shown as s1, s2, . . . , and sm). The multiplexing operation also consists of providing each source with an opportunity to occupy one or more time slots. The demultiplexing operation consists of deslotting the information and delivering that data to the intended receiving device. The two commutating switches shown in the diagram need to be synchronized so that the message corresponding to the source 1 (e.g., s1) appear on channel 1; and so that the message corresponding to the source 2 (e.g., s2) appear on channel 2; and so on. Generally speaking, the message generally comprises of a preamble portion and a payload/data portion. The preamble portion generally contains synchronization, addressing, and/or error control sequences.

As shown in this diagram, this fixed assignment TDMA scheme is extremely efficient when the source requirements are predictable, and the traffic (e.g., throughput) is heavy (e.g., the time slots are most always filled). However, when the traffic is sporadic or bursty, the fixed assignment approach may not fully utilize all of the available resources of the communication system.

When considering this TDMA communication system in the context of SOPs (Simultaneously Operating Piconets), TDMA communication may be supported by ensuring that the various SOPs are all synchronized. This may allow even greater utilization of the communication resources contained therein by ensuring that the various SOPs may operate simultaneously using TDMA with a very high degree of confidence that interference may be significantly avoided (if not avoided completely). The advantageous effects of TDMA are further described below as well as the potentially disastrous effects of TDMA when synchronization is not maintained.

FIG. 6A is a diagram illustrating an embodiment of 2 synchronized SOPs (Simultaneously Operating Piconets) using TDMA that may be supported according to the invention. When each of the SOPs operate using TDMA, then appropriate transmission slots may be employed by various communication systems (e.g., by the 2 SOPs) such that they are orthogonal to one another. That is to say, the TDMA transmission slots employed by each of the piconets (e.g., a piconet 1 and a piconet 2) never employ the same portion of the available frequency spectrum at the same time. When the 2 SOPs are fully synchronized, and when each of the piconets employs distinct TDMA transmission slot that are orthogonal to the other TDMA transmission slots employed by the other piconets, then the 2 SOPs may operate in a coexistent manner such that no interference is encountered between them.

More specifically, when considering the synchronized operation of the 2 SOPs here, the piconet 1 employs a TDMA transmission slots that happens also to be periodic sequence (having a period of 3—using frequency bands 1, 2, and 3; this TDMA transmission slots then continues to repeat). It is noted that the TDMA transmission slots need not necessarily be periodic. The piconet 2 also employs a TDMA transmission slots that also happens to be a periodic sequence having a period of 3—except using frequency bands 3, 1, and 2; this TDMA transmission slots also continues to repeat in a periodic fashion. As can be seen, at any given time, the frequency band employed by one of the piconets is different than the frequency band employed by the other piconet. These 2 TDMA transmission slots are therefore orthogonal to one another and allow for simultaneously operation of the 2 piconets using TDMA without experiencing any deleterious interference.

FIG. 6B is a diagram illustrating an embodiment of 2 non-synchronized SOPs using TDMA that undergo a significant amount of interference when not employing various aspects of the invention. This diagram shows the potentially catastrophic effects of interference that may result when you SOPs are operating in a non-synchronized manner; specifically, this diagram shows what can happen when complete destructive interference results between the 2 SOPs.

In this diagram, as in the one described above, the 2 piconets have the same TDMA transmission slots that also happen to be periodic sequences. However, the TDMA transmission slots of the piconet 1 have undergone a shift in phase of ⅓ of its TDMA transmission slots (which has a period of 3). Because of this, the TDMA transmission slots of the 2 piconets unfortunately interfere with one another catastrophically as can be seen in the diagram. Clearly, this diagram shows a worst case scenario where complete destructive interference is experienced by the 2 SOPs that do not operate in synchronization.

However, even when the phase shift is not precisely ⅓ of the TDMA periodic sequence (which has a period of 3), there will nevertheless be some interference generated by the time slots that do overlap with one another. Such an example is shown pictorially with reference to FIG. 7B. Therefore, to use TDMA effectively for 2 SOPs operating within relatively close proximity with one another, there needs to be some mechanism of synchronization between the TDMA transmission slots used by the 2 SOPs.

Figure 7A:
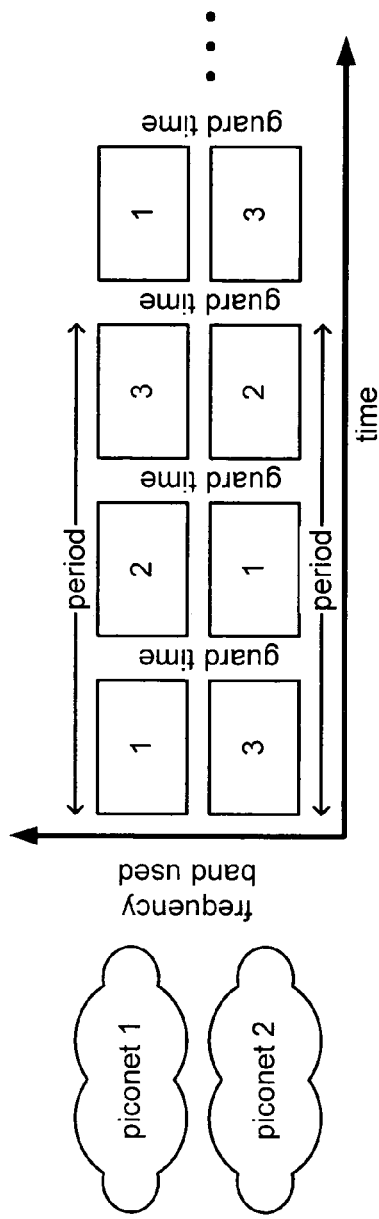
FIG. 7A is identical to FIG. 6A and is provided again for comparison to FIG. 7B.
Figure 7B:
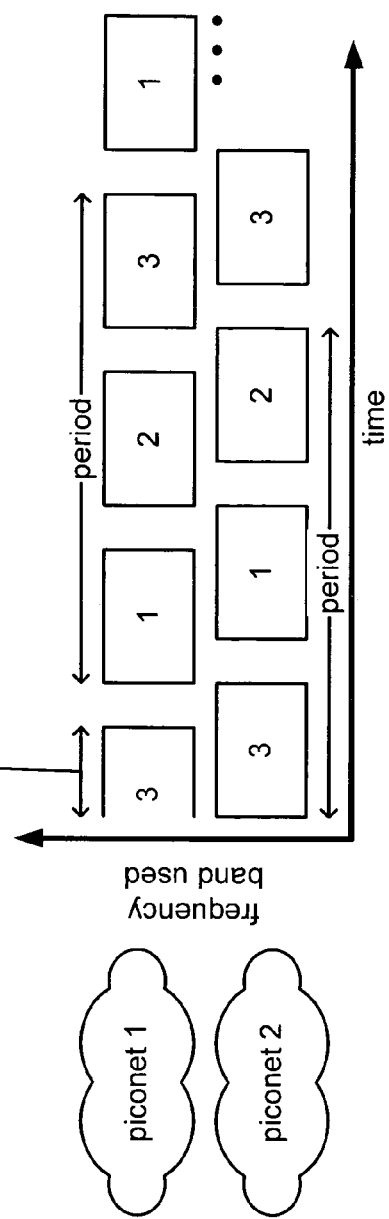
FIG. 7B is a diagram illustrating an embodiment of 2 non-synchronized SOPs using TDMA that undergo a smaller significant amount of interference than that shown within FIG. 6B when not employing various aspects of the invention.

FIG. 7A is identical to FIG. 6A and is provided again for comparison to FIG. 7B.

FIG. 7B is a diagram illustrating an embodiment of 2 non-synchronized SOPs using TDMA that undergo a smaller significant amount of interference than that shown within FIG. 6B when not employing various aspects of the invention.

As can be seen, the diagram shows the partial interference (as opposed to the complete interference example of FIG. 6B) that can occur when there is a phase shift. The phase shift of this diagram is not precisely ⅓ of the TDMA transmission slots (which has a period of 3); in fact, it is shown as being less than a ⅓ phase shift. As a result, the TDMA transmission slots of these two SOPs only interfere partially.

It is again noted that some interference may be unavoidable in some situations. For example, as described also above with respect to FIG. 4, as the number of SOPs continues to increase and when they operate using TFCs having a finite and fixed number of frequency bands, it may become impossible to ensure complete orthogonality given the inherent periodicity of the TFCs and/or finite number of frequency bands that limit the number of frequency hops that may be performed.

Figure 8A:
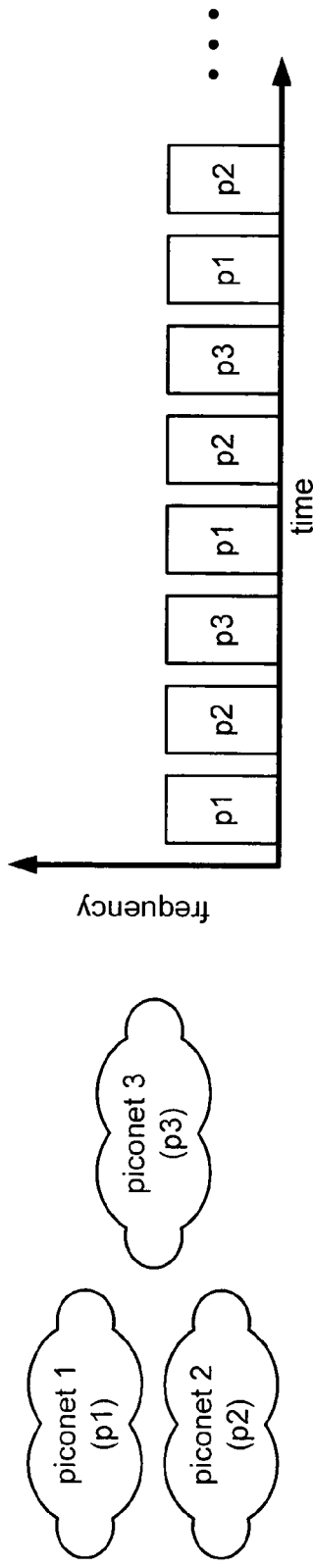
FIG. 8A is a diagram illustrating an embodiment of 3 SOPs using TDMA only according to the invention.

FIG. 8A is a diagram illustrating an embodiment of 3 SOPs using TDMA only according to the invention. Three separate SOPs operate using specified time slots within each frame. As a function of time, the various piconets in this diagram (e.g., a piconet 1, a piconet 2, and a piconet 3) each use time slots shown as p1, p2, and p3, respectively. For a given frame, the various piconets cycle through these TDMA transmission slots where each of the piconets is afforded a particular time slot thereby ensuring that the communication within the various piconets do not interfere with one another.

Figure 8B:
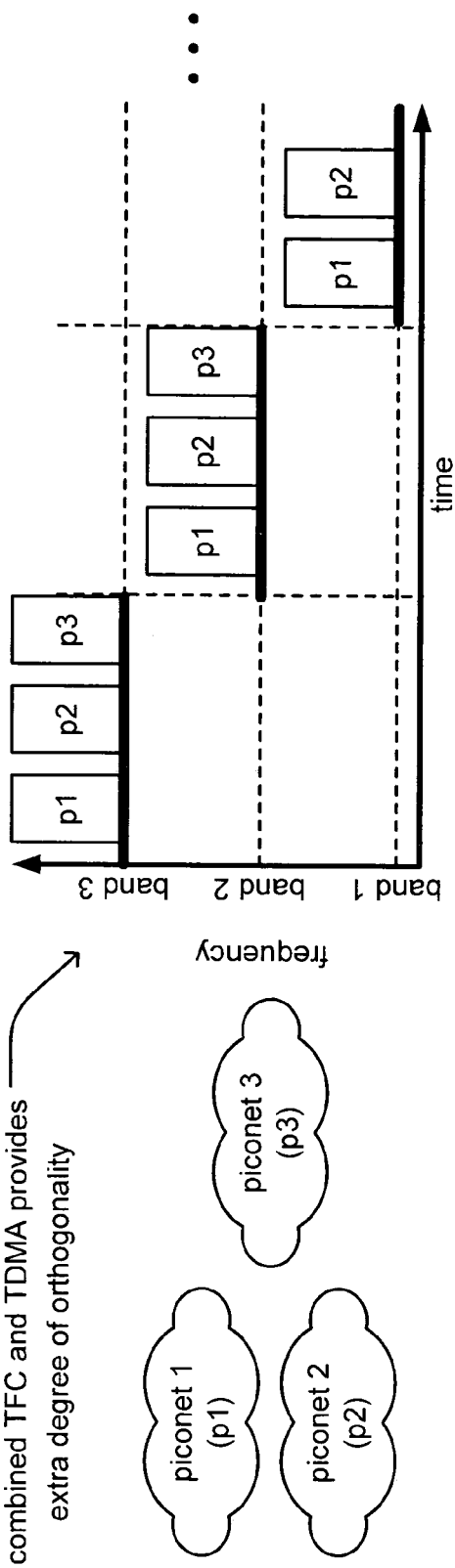
FIG. 8B is a diagram illustrating an embodiment of 3 SOPs using combined TFC and TDMA according to the invention.

FIG. 8B is a diagram illustrating an embodiment of 3 SOPs using combined TFC (time frequency code) and TDMA according to the invention. This diagram shows an extension of the embodiment of the previous diagram that performs TDMA only; this diagram shows a combination of a TFC and TDMA. The same TDMA transmission slots may still be employed with the addition of a TFC that offers an extra degree of orthogonality of the communication within the various piconets. This combination of TFC and TDMA provides for many of the benefits described above from the use of TFCs. For example, the deleterious effects of narrowband or localized noise may be reduced by using this combination of TFC and TDMA.

In this diagram, the same TDMA transmission slots are employed, with the addition that the frequency band in which any given TDMA transmission slot operates at a given time varies as a function of the TFC. More specifically in this diagram, a first instance of the TDMA transmission slots uses a frequency band 3; a second instance of the TDMA transmission slots uses a frequency band 2; and a third instance of the TDMA transmission slots uses a frequency band 1.

Figure 9:
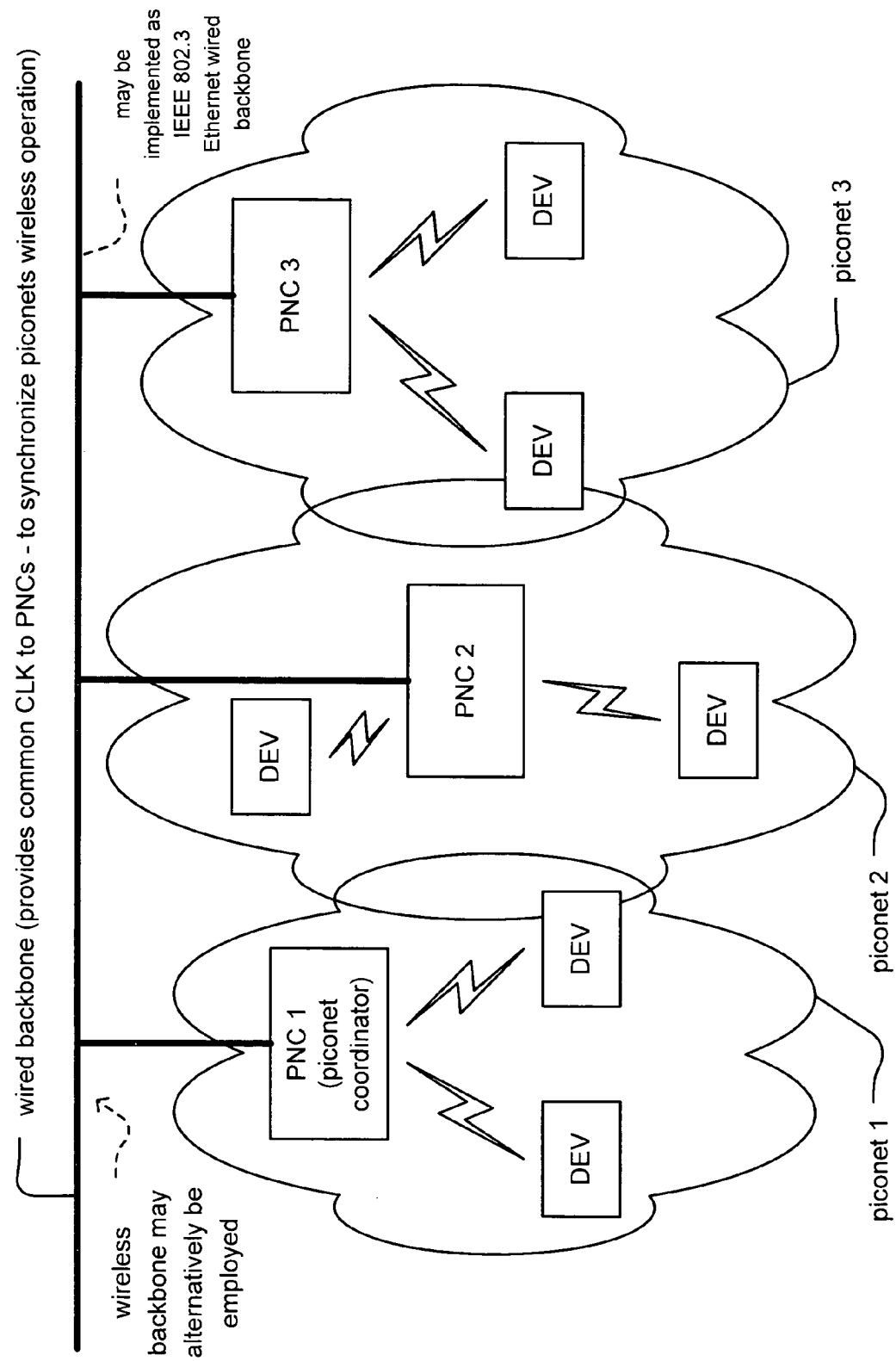
FIG. 9 is a diagram illustrating an embodiment of 3 SOPs with their respective PNCs (piconet coordinators) communicatively coupled to a common backbone (wired or wireless) according to the invention.

FIG. 9 is a diagram illustrating an embodiment of 3 SOPs with their respective PNCs (piconet coordinators) communicatively coupled to a common backbone (wired or wireless) according to the invention. This diagram shows a very generic embodiment of the invention where a common backbone is communicatively coupled to each of the PNCs (piconet coordinators) of the Various SOPs that operate within relatively close proximity with one another. This common back may be implemented any number of ways including either wired or wireless means. Many various embodiments of such SOPs operating within relatively close proximity with one another may be envisioned. For example, multiple SOPs may be operating within a household, within an office, within an apartment complex, and so on. Generally speaking, any SOPs operating within relatively close proximity with one another may benefit from the various aspects of the invention.

A piconet 1 includes a PNC (piconet coordinator) 1 and its corresponding DEVs (user piconet devices). A piconet 2 includes a PNC 2 and its corresponding DEVs. Similarly, a piconet 3 includes a PNC 2 and its corresponding DEVs. These 3 piconets may be viewed as being SOPs operating within relatively close proximity with one another. For TDMA to be employed effectively by them, and in an effort to ensure appropriate synchronization of their operation, a wired backbone provides a common CLK (clock signal) to all of the PNCs such that they may maintain synchronization. This common reference (the CLK signal) helps maintain synchronization for the TDMA transmission slots of all of the communications supported within the various piconets. Each of the piconets is assigned 1 or more appropriate time slots within the TDMA transmission slots employed by each of the various piconets. While this wired backbone may be viewed as a compromise of the totally wireless nature that piconets seek to provide, it nevertheless ensures appropriate synchronization of the various SOPs thereby allowing the support of TDMA communications therein.

There are a variety of ways in which this wired backbone may be implemented. For example, in one instance, the wired backbone is supported using Ethernet. The wired backbone may be implemented as an IEEE 802.3 Ethernet wired backbone. In other instances, it may be supported using an exiting wired backbone that may be provisioned by some other communication protocol or standard. Various other embodiments of how this may be implemented in an effort to ensure synchronization of the TDMA communication therein are described below.

Figure 10:
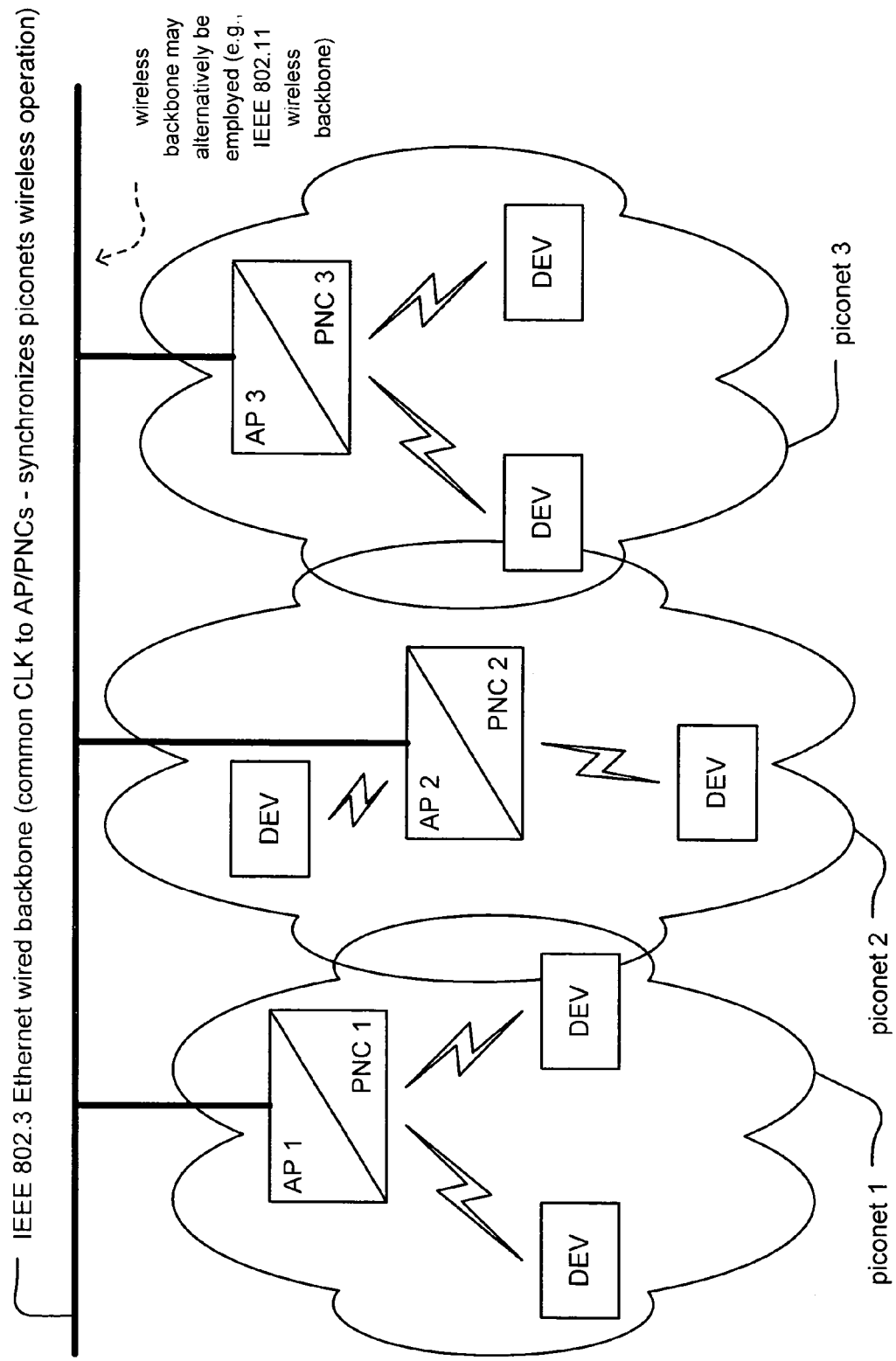
FIG. 10 is a diagram illustrating an embodiment of 3 SOPs with their respective combined IEEE 802.11 APs (Access Points)/IEEE 802.15.3a PNCs communicatively coupled to an IEEE 802.3 Ethernet wired backbone according to the invention.

FIG. 10 is a diagram illustrating an embodiment of 3 SOPs with their respective combined IEEE (Institute of Electrical & Electronics Engineers) 802.11 APs (Access Points)/IEEE 802.15.3a PNCs communicatively coupled to an IEEE 802.3 Ethernet wired backbone according to the invention. As is known in the technology space of IEEE 802.11 WLANs (Wireless Local Area Networks), a wired backbone is often employed to communicatively couple the various APs (Access Points) by which 802.11 user devices may access the WLAN. In this embodiment, these APs are a combination type device that includes both the functionality to support the 802.11 WLAN communication protocol and the functionality to support the 802.15.3a piconet communication protocol. These combination AP/PNC devices include the functionality of both 802.11 and 802.15.3a. In doing this, a CLK signal provided by the 802.11 communication protocol to the APs of the WLAN may be employed to provide the CLK that is used to support the synchronization of the piconets. This CLK may be supplied simultaneously to all of the PNCs of the respective PNCs that are communicatively coupled to the wired backbone. Once the operation of the PNCs of the various piconets is synchronized, then the various piconets may support TDMA communications without interfering with one another. By ensuring that the TDMA transmission slots employed by each of the piconets are all synchronized, then the possibility of interference between the various SOPs may be substantially reduced if not eliminated completely.

Figure 11:
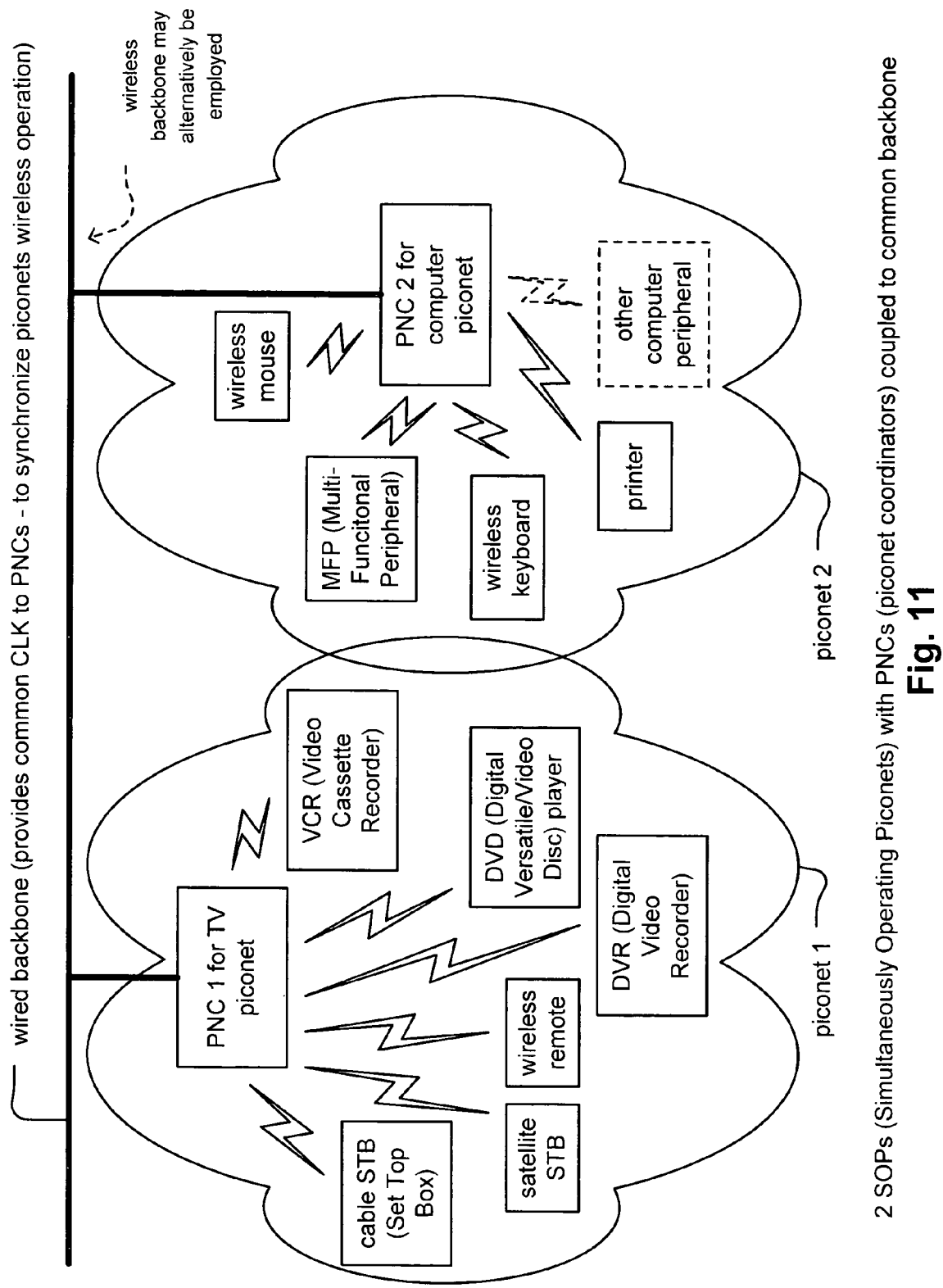
FIG. 11 is a diagram illustrating an alternative embodiment of 2 SOPs with their respective PNCs communicatively coupled to a common backbone according to the invention.

FIG. 11 is a diagram illustrating an alternative embodiment of 2 SOPs with their respective PNCs communicatively coupled to a common backbone according to the invention. This diagram shows one specific implementation of the synchronized UWB piconets allowing for efficient SOP operation while minimizing the deleterious effects of interference. Again, as within other embodiments, the common backbone may be implemented any number of ways including both wired and wireless means. These 2 SOPs are shown as being a TV (television)-centric piconet and a computer-centric piconet. Each of the piconets is employed to maintain and support communication between the TV and the computer, respectively, and its corresponding peripheral type devices.

For example, the TV-centric piconet (e.g., TV piconet shown as a piconet 1) includes a PNC 1 that operates as the coordinator of the communications therein. The TV piconet may include a number of different peripheral type devices including a cable STB (Set Top Box), a satellite STB, a VCR (Video Cassette Recorder), a wireless remote, a DVD (Digital Versatile/Video Disc) player, a DVR (Digital Video Recorder), and/or other peripheral type devices appropriate for a media/TV entertainment region services by the TV piconet. For example, various types of surround sound/home theater/stereo equipment may also include piconet communication capable functionality to support communication with the PNC 1 and/or the other peripheral devices within the TV piconet.

Analogously, a computer-centric piconet (e.g., a computer piconet shown as a piconet 2) includes a PNC 2 that operates as the coordinator of the communications therein. The computer piconet may include a number of different peripheral type devices including a wireless mouse, a wireless keyboard, an MFP (Multi-Functional Peripheral—such as a printer, facsimile, copier device and/or scanner), a printer, and/or other computer peripheral devices appropriate for a computer operating region. Each of these computer peripheral devices also includes the appropriate functionality to support piconet communication within the PNC 2 and the other computer peripheral devices contained within the computer piconet.

The PNC 1 and the PNC 2 are communicatively coupled to a wired backbone by which a CLK is provided to ensure that the TDMA communications of the TV piconet and the computer piconet are synchronized. This diagram shows just one of the many ways in which 2 SOPs may be co-existent in relatively close proximity with one another. For effective TDMA communications to be performed within each of these piconets, a degree of synchronization should be maintained for the TDMA transmission slots employed therein.

Figure 12:
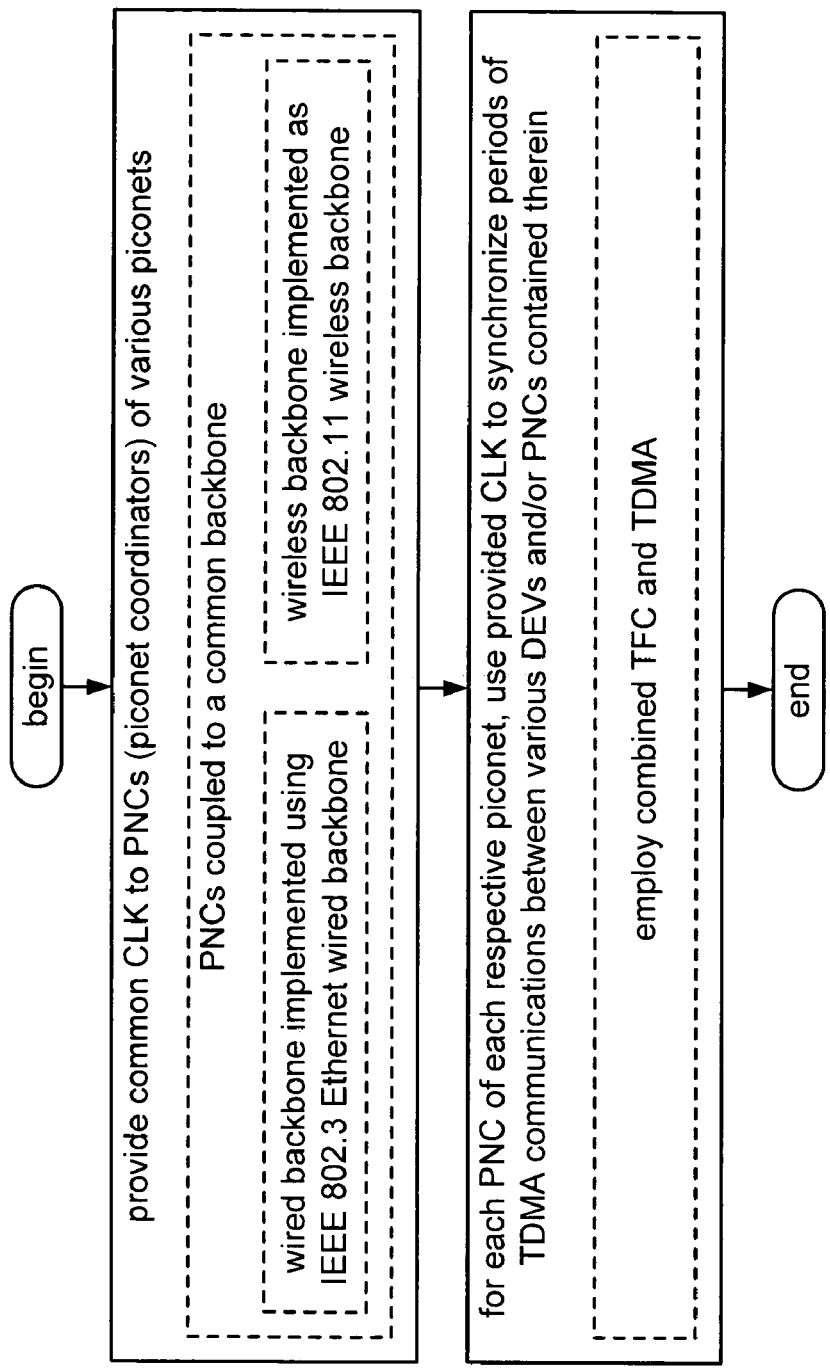
FIG. 12 and FIG. 13 are flowcharts illustrating various embodiments of methods for operating synchronized SOPs (Simultaneously Operating Piconets) according to the invention.
Figure 13:
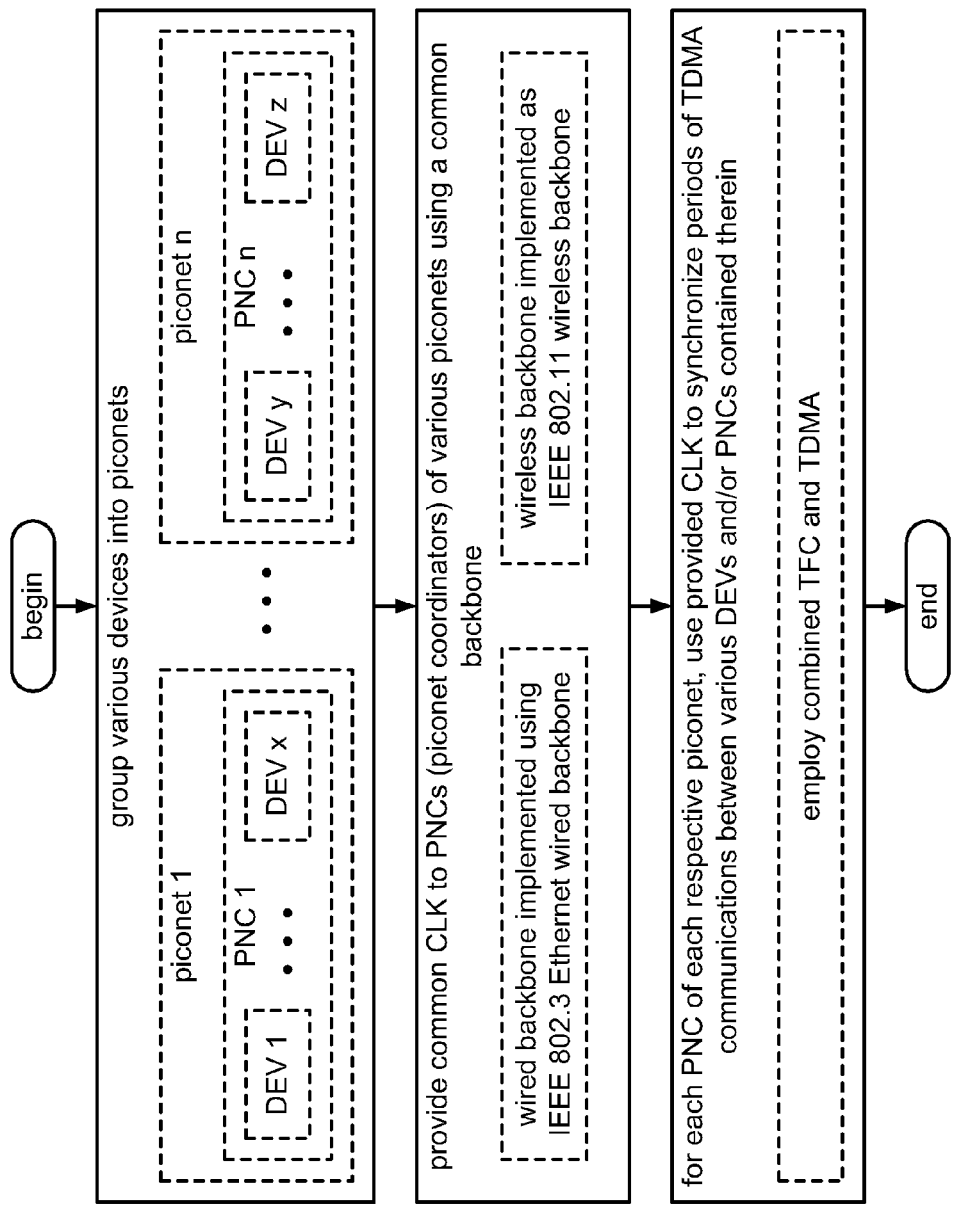

FIG. 12 and FIG. 13 are flowcharts illustrating various embodiments of methods for operating synchronized SOPs (Simultaneously Operating Piconets) according to the invention.

Referring now to the FIG. 12, the method operates by providing a common CLK to the PNCs of various piconets. These PNCs may be communicatively coupled to a common backbone thereby ensuring a highly reliable manner of providing the CLK thereto. This backbone may be implemented as a wired backbone using an IEEE 802.3 Ethernet wired backbone. Alternatively, this backbone may be implemented using an IEEE 802.11 wireless backbone that operates according to an 802.11 wireless means and communicatively couples the various APs of an 802.11 WLAN.

Then, for each PNC of the respective piconets, the method continues by using the provided CLK (received via the backbone) to synchronize periods of TDMA communications between the various DEVs and/or PNCs of the various piconets contained therein. These TDMA supported communications may be performed by using combined TFC and TDMA as well.

Generally speaking, the method of operating multiple piconets (though they are inherently wireless in nature) by employing a backbone communicatively coupled to each of the PNCs of the various piconets allows for effective and reliable synchronization of the TDMA transmission slots employed within the various piconets.

Referring now to the FIG. 13, this method is similar to the embodiment described above with the addition of performing the grouping of a number of DEVs and PNCs into appropriate piconets such that each piconet has a PNC and its corresponding DEVs. For example, a piconet 1 includes a PNC 1 that serves as the coordinator of a DEV 1 through a DEV x. Other piconets may also be included that have a PNC and its corresponding DEVs as well. A piconet n includes a PNC n that serves as the coordinator of a DEV y through a DEV z. The grouping of the various PNCs and DEVs into these multiple piconets may be performed based upon location, communication functionality and capability (e.g., such as higher and lower data rate capable devices), piconet type (e.g., such as a TV type piconet, a computer type piconet, and so on).

Once each of the PNCs and DEVs has been grouped into an appropriate piconet, the method then continues by providing a common CLK to the PNCs of the various piconets using a common backbone that communicatively couples to each of the PNCs. Again, by using this common backbone, a highly reliable manner of providing this synchronizing CLK to each of the PNCs is performed thereby ensuring that the TDMA communications of the various piconets may operate with a high degree of synchronization.

This backbone may be implemented as a wired backbone using an IEEE 802.3 Ethernet wired backbone. Alternatively, this backbone may be implemented using an IEEE 802.11 wireless backbone that operates according to an 802.11 wireless means and communicatively couples the various APs of an 802.11 WLAN.

Then, for each PNC of the respective piconets, the method continues by using the provided CLK (received via the common backbone) to synchronize periods of TDMA communications between the various DEVs and/or PNCs of the various piconets contained therein. These TDMA supported communications may be performed by using combined TFC and TDMA as well.

It is also noted that the various methods described here within the FIG. 12 and FIG. 13 may also be performed within the appropriate device and/or system embodiments described within other portions of this specification.

Moreover, it is also noted that the various descriptions (and corresponding figures) provided above is also applicable to SOPs such that the individual communication devices (e.g. DEVs) within each of the piconets is operates according to an ad hoc arrangement. In such an ad hoc arrangement, the DEVs of the piconet operate essentially in a p2p (peer to peer) arrangement, and there is no PNC within the piconet. When an ad hoc piconet is being formed, then the $1^{st}$ communication device that associates with the backbone (be it implemented in a wired or wireless manner) may be viewed as serving as a "virtual PNC" with respect to the other DEVs of that piconet. This DEV, which operates as a "virtual PNC" in an ad hoc piconet, is then operable to provide the synchronization information to each of the other DEVs within that particular ad hoc piconet. The synchronization is then based on the beacon period start time that is associated with the $1^{st}$ DEV to come in when forming the piconet in an ad hoc arrangement.

Generally speaking, any of the communication devices within a piconet may be designated as a "virtual PNC" when providing the synchronization information to the other of the communication devices within the piconet. This "virtual PNC" may be viewed as providing the synchronization functionality of a PNC (as described above). The other functionality that a PNC (as described above) may include need not necessarily be included within this "virtual PNC."

In view of the above detailed description of the invention and associated drawings, other modifications and variations will now become apparent. It should also be apparent that such other modifications and variations may be effected without departing from the spirit and scope of the invention.

What is claimed is:

1. A WPAN (Wireless Personal Area Network) communication system, the system comprising:
a first piconet including a first PNC (piconet coordinator) and a first plurality of DEVs (user piconet devices);
wherein the first PNC and the first plurality of DEVs are operable to communicate with each other using UWB (Ultra Wide Band) signals according to a first TDMA (Time Division Multiple Access) transmission slots;
a second piconet including a second PNC and a second plurality of DEVs;
wherein the second PNC and the second plurality of DEVs are operable to communicate with each other using UWB signals according to a second TDMA transmission slots;
a wired backbone that is communicatively coupled to the first PNC and the second PNC;
wherein a CLK (clock signal) is provided to each of the first PNC and the second PNC via the wired backbone; and
wherein the first PNC and the second PNC use the CLK to synchronize the first TDMA transmission slots and the second TDMA transmission slots.

2. The system of claim 1, wherein:
the first PNC and the first plurality of DEVs are operable to communicate with each other using the first TDMA transmission slots that is implemented according to a first TFC (time frequency code).

3. The system of claim 1, wherein:
the second PNC and the second plurality of DEVs are operable to communicate with each other using the second TDMA transmission slots that is implemented according to a second TFC (time frequency code).

4. The system of claim 1, further comprising:
a third piconet including a third PNC and a third plurality of DEVs; and wherein:
the third PNC and the third plurality of DEVs are operable to communicate with each other using UWB signals according to a third TDMA transmission slots; and
the wired backbone is also communicatively coupled to the third PNC.

5. The system of claim 1, wherein:
the first PNC is implemented within a first combination AP (Access Point)/PNC that supports communications within both the first piconet and a first WLAN (Wireless Local Area Network); and
the second PNC is implemented within a second combination AP/PNC that supports communications within both the second piconet and a second WLAN.

6. The system of claim 1, wherein:
the first piconet operates within a first region;
the second piconet operates within a second region; and
the first region and the second region occupy at least a portion of common space.

7. The system of claim 1, wherein:
the first piconet is a TV (television) piconet; and
the first plurality of DEVs includes at least one of a wireless remote, a cable STB (Set Top Box), a satellite STB, a VCR (Video Cassette Recorder), a DVD (Digital Versatile/Video Recorder), and a DVR (Digital Video Recorder) that includes piconet operable communication functionality.

8. The system of claim 1, wherein:
the first piconet is a computer piconet; and
the second plurality of DEVs includes at least one of a wireless mouse, a wireless mouse keyboard, a printer, and an MFP (Multi-Functional Peripheral) that includes piconet operable communication functionality.

9. The system of claim 1, wherein:
the first PNC facilitates p2p (peer to peer) communication between a first DEV and a second DEV of the first plurality of DEVs.

10. The system of claim 1, wherein:
the UWB signals employed within the first piconet and the second piconet occupy a frequency spectrum that spans from approximately 3.1 GHz (Giga-Hertz) to approximately 10.6 GHz; and
the frequency spectrum is partitioned into a plurality of frequency bands each having a bandwidth of approximately 500 MHz (Mega-Hertz).

11. A WPAN (Wireless Personal Area Network) communication system, the system comprising:
a first piconet including a first PNC (piconet coordinator) and a first plurality of DEVs (user piconet devices);
wherein the first PNC and the first plurality of DEVs are operable to communicate with each other using UWB (Ultra Wide Band) signals according to a first TDMA (Time Division Multiple Access) transmission slots that is implemented according to a first TFC (time frequency code);
a second piconet including a second PNC and a second plurality of DEVs;
wherein the second PNC and the second plurality of DEVs are operable to communicate with each other using UWB signals according to a second TDMA transmission slots that is implemented according to a second TFC;
a wired backbone that is communicatively coupled to the first PNC and the second PNC;
wherein a CLK (clock signal) is provided to each of the first PNC and the second PNC via the wired backbone;
wherein the first PNC and the second PNC use the CLK to synchronize the first TDMA transmission slots and the second TDMA transmission slots;
wherein the first piconet operates within a first region;
wherein the second piconet operates within a second region; and
wherein the first region and the second region occupy at least a portion of common space.

12. The system of claim 11, further comprising:
a third piconet including a third PNC and a third plurality of DEVs; and wherein:
the third PNC and the third plurality of DEVs are operable to communicate with each other using UWB signals according to a third TDMA transmission slots; and
the wired backbone is also communicatively coupled to the third PNC.

13. The system of claim 11, wherein:
the first PNC is implemented within a first combination AP (Access Point)/PNC that supports communications within both the first piconet and a first WLAN (Wireless Local Area Network); and
the second PNC is implemented within a second combination AP/PNC that supports communications within both the second piconet and a second WLAN.

14. The system of claim 11, wherein:
the first piconet is a TV (television) piconet; and
the first plurality of DEVs includes at least one of a wireless remote, a cable STB (Set Top Box), a satellite STB, a VCR (Video Cassette Recorder), a DVD (Digital Versatile/Video Recorder), and a DVR (Digital Video Recorder) that includes piconet operable communication functionality.

15. The system of claim 11, wherein:
the first piconet is a computer piconet; and
the second plurality of DEVs includes at least one of a wireless mouse, a wireless mouse keyboard, a printer, and an MFP (Multi-Functional Peripheral) that includes piconet operable communication functionality.

16. The system of claim 11, wherein:
the first PNC facilitates p2p (peer to peer) communication between a first DEV and a second DEV of the first plurality of DEVs.

17. The system of claim 11, wherein:
the UWB signals employed within the first piconet and the second piconet occupy a frequency spectrum that spans from approximately 3.1 GHz (Giga-Hertz) to approximately 10.6 GHz; and
the frequency spectrum is partitioned into a plurality of frequency bands each having a bandwidth of approximately 500 MHz (Mega-Hertz).

18. A WPAN (Wireless Personal Area Network) communication system, the system comprising:
a first piconet including a first PNC (piconet coordinator) and a first plurality of DEVs (user piconet devices);
wherein the first PNC and the first plurality of DEVs are operable to communicate with each other using UWB (Ultra Wide Band) signals according to a first TDMA (Time Division Multiple Access) transmission slots;
a second piconet including a second PNC and a second plurality of DEVs;
wherein the second PNC and the second plurality of DEVs are operable to communicate with each other using UWB signals according to a second TDMA transmission slots;
a wireless backbone that is communicatively coupled to the first PNC and the second PNC;
wherein a CLK (clock signal) is provided to each of the first PNC and the second PNC via the wireless backbone; and
wherein the first PNC and the second PNC use the CLK to synchronize the first TDMA transmission slots and the second TDMA transmission slots.

19. The system of claim 18, wherein:
the first PNC and the first plurality of DEVs are operable to communicate with each other using the first TDMA transmission slots that is implemented according to a first TFC (time frequency code).

20. The system of claim 18, wherein:
the second PNC and the second plurality of DEVs are operable to communicate with each other using the second TDMA transmission slots that is implemented according to a second TFC (time frequency code).

21. The system of claim 18, further comprising:
a third piconet including a third PNC and a third plurality of DEVs; and wherein:
the third PNC and the third plurality of DEVs are operable to communicate with each other using UWB signals according to a third TDMA transmission slots; and
the wireless backbone is also communicatively coupled to the third PNC.

22. The system of claim 18, wherein:
the first PNC is implemented within a first combination AP (Access Point)/PNC that supports communications within both the first piconet and a first WLAN (Wireless Local Area Network); and
the second PNC is implemented within a second combination AP/PNC that supports communications within both the second piconet and a second WLAN.

23. The system of claim 18, wherein:
the first piconet operates within a first region;
the second piconet operates within a second region; and
the first region and the second region occupy at least a portion of common space.

24. The system of claim 18, wherein:
the first piconet is a TV (television) piconet; and
the first plurality of DEVs includes at least one of a wireless remote, a cable STB (Set Top Box), a satellite STB, a VCR (Video Cassette Recorder), a DVD (Digital Versatile/Video Recorder), and a DVR (Digital Video Recorder) that includes piconet operable communication functionality.

25. The system of claim 18, wherein:
the first piconet is a computer piconet; and
the second plurality of DEVs includes at least one of a wireless mouse, a wireless mouse keyboard, a printer, and an MFP (Multi-Functional Peripheral) that includes piconet operable communication functionality.

26. The system of claim 18, wherein:
the first PNC facilitates p2p (peer to peer) communication between a first DEV and a second DEV of the first plurality of DEVs.

27. The system of claim 18, wherein:
the UWB signals employed within the first piconet and the second piconet occupy a frequency spectrum that spans from approximately 3.1 GHz (Giga-Hertz) to approximately 10.6 GHz; and
the frequency spectrum is partitioned into a plurality of frequency bands each having a bandwidth of approximately 500 MHz (Mega-Hertz).

28. A WPAN (Wireless Personal Area Network) communication system, the system comprising:
a first piconet including a first PNC (piconet coordinator) and a first plurality of DEVs (user piconet devices);
wherein the first PNC and the first plurality of DEVs are operable to communicate with each other using UWB (Ultra Wide Band) signals according to a first TDMA (Time Division Multiple Access) transmission slots that is implemented according to a first TFC (time frequency code);
a second piconet including a second PNC and a second plurality of DEVs;
wherein the second PNC and the second plurality of DEVs are operable to communicate with each other using UWB signals according to a second TDMA transmission slots that is implemented according to a second TFC;
a wireless backbone that is communicatively coupled to the first PNC and the second PNC;
wherein a CLK (clock signal) is provided to each of the first PNC and the second PNC via the wireless backbone;
wherein the first PNC and the second PNC use the CLK to synchronize the first TDMA transmission slots and the second TDMA transmission slots;
wherein the first piconet operates within a first region;
wherein the second piconet operates within a second region; and
wherein the first region and the second region occupy at least a portion of common space.

29. The system of claim 28, further comprising:
a third piconet including a third PNC and a third plurality of DEVs; and wherein:
the third PNC and the third plurality of DEVs are operable to communicate with each other using UWB signals according to a third TDMA transmission slots; and
the wireless backbone is also communicatively coupled to the third PNC.

30. The system of claim 28, wherein:
the first PNC is implemented within a first combination AP (Access Point)/PNC that supports communications within both the first piconet and a first WLAN (Wireless Local Area Network); and
the second PNC is implemented within a second combination AP/PNC that supports communications within both the second piconet and a second WLAN.

31. The system of claim 28, wherein:
the first piconet is a TV (television) piconet; and
the first plurality of DEVs includes at least one of a wireless remote, a cable STB (Set Top Box), a satellite STB, a VCR (Video Cassette Recorder), a DVD (Digital Versatile/Video Recorder), and a DVR (Digital Video Recorder) that includes piconet operable communication functionality.

32. The system of claim 28, wherein:
the first piconet is a computer piconet; and
the second plurality of DEVs includes at least one of a wireless mouse, a wireless mouse keyboard, a printer, and an MFP (Multi-Functional Peripheral) that includes piconet operable communication functionality.

33. The system of claim 28, wherein:
the first PNC facilitates p2p (peer to peer) communication between a first DEV and a second DEV of the first plurality of DEVs.

34. The system of claim 28, wherein:
the UWB signals employed within the first piconet and the second piconet occupy a frequency spectrum that spans from approximately 3.1 GHz (Giga-Hertz) to approximately 10.6 GHz; and
the frequency spectrum is partitioned into a plurality of frequency bands each having a bandwidth of approximately 500 MHz (Mega-Hertz).

35. A method for operating synchronized SOPs (Simultaneously Operating Piconets) within a WPAN (Wireless Personal Area Network), the method comprising:
providing a CLK (clock signal) to a first PNC (piconet coordinator) of a first piconet and to a second PNC of a second piconet;
within the first piconet, supporting communication between the first PNC and a first plurality of DEVs (user piconet devices) using UWB (Ultra Wide Band) signals according to a first TDMA (Time Division Multiple Access) transmission slots;
within the second piconet, supporting communication between the second PNC and a second plurality of DEVs using UWB signals according to a second TDMA transmission slots;

using the CLK to synchronize the first TDMA transmission slots and the second TDMA transmission slots within each of the first PNC and the second PNC.

36. The method of claim 35, further comprising:
within the first piconet, supporting communication between the first PNC and the first plurality of DEVs using UWB (Ultra Wide Band) signals according to the first TDMA transmission slots that is implemented according to a first TFC (time frequency code).

37. The method of claim 35, further comprising:
within the second piconet, supporting communication between the second PNC and the second plurality of DEVs using UWB signals according to the second TDMA transmission slots that is implemented according to a second TFC (time frequency code).

38. The method of claim 35, wherein:
the CLK is provided to the first PNC and the second PNC via a wired backbone that communicatively couples to the first PNC and the second PNC.

39. The method of claim 38, further comprising:
a third piconet including a third PNC and a third plurality of DEVs; and wherein:
the third PNC and the third plurality of DEVs are operable to communicate with each other using UWB signals according to a third TDMA transmission slots; and
the wired backbone is also communicatively coupled to the third PNC.

40. The method of claim 39, wherein:
the first PNC is implemented within a first combination AP (Access Point)/PNC that supports communications within both the first piconet and a first WLAN (Wireless Local Area Network); and
the second PNC is implemented within a second combination AP/PNC that supports communications within both the second piconet and a second WLAN.

41. The method of claim 35, wherein:
the CLK is provided to the first PNC and the second PNC via a wireless backbone that communicatively couples to the first PNC and the second PNC.

42. The method of claim 41, further comprising:
a third piconet including a third PNC and a third plurality of DEVs; and wherein:
the CLK is provided to the third PNC via the wireless backbone that communicatively couples to the first PNC, the second PNC, and the third PNC;
the third PNC and the third plurality of DEVs are operable to communicate with each other using UWB signals according to a third TDMA transmission slots; and
the wireless backbone is also communicatively coupled to the third PNC.

43. The method of claim 42, wherein:
the first PNC is implemented within a first combination AP (Access Point)/PNC that supports communications within both the first piconet and a first WLAN (Wireless Local Area Network); and
the second PNC is implemented within a second combination AP/PNC that supports communications within both the second piconet and a second WLAN.

44. The method of claim 35, further comprising:
operating the first piconet within a first region;
operating the second piconet within a second region; and
wherein the first region and the second region occupy at least a portion of common space.

45. The method of claim 35, wherein:
the first piconet is a TV (television) piconet; and
the first plurality of DEVs includes at least one of a wireless remote, a cable STB (Set Top Box), a satellite STB, a VCR (Video Cassette Recorder), a DVD (Digital Versatile/Video Recorder), and a DVR (Digital Video Recorder) that includes piconet operable communication functionality.

46. The method of claim 35, wherein:
the first piconet is a computer piconet; and
the second plurality of DEVs includes at least one of a wireless mouse, a wireless mouse keyboard, a printer, and an MFP (Multi-Functional Peripheral) that includes piconet operable communication functionality.

47. The method of claim 35, further comprising:
facilitating p2p (peer to peer) communication between a first DEV and a second DEV of the first plurality of DEVs using the first PNC.

48. The method of claim 35, wherein:
the UWB signals employed within the first piconet and the second piconet occupy a frequency spectrum that spans from approximately 3.1 GHz (Giga-Hertz) to approximately 10.6 GHz; and
the frequency spectrum is partitioned into a plurality of frequency bands each having a bandwidth of approximately 500 MHz (Mega-Hertz).

* * * * *